(12) United States Patent
Chamberlin

(10) Patent No.: US 6,920,955 B2
(45) Date of Patent: Jul. 26, 2005

(54) PHYSICAL ACTIVITY CONTROL SYSTEM FOR MOTOR VEHICLES

(76) Inventor: Brian Chamberlin, 5525 Delacroix Way, Yorba Linda, CA (US) 92887

( * ) Notice: Subject to any disclaimer, the term of this patent is extended or adjusted under 35 U.S.C. 154(b) by 323 days.

(21) Appl. No.: 10/376,045

(22) Filed: Feb. 26, 2003

(65) Prior Publication Data

US 2003/0199362 A1 Oct. 23, 2003

Related U.S. Application Data

(60) Provisional application No. 60/360,480, filed on Feb. 26, 2002.

(51) Int. Cl.[7] ............................................. B60K 26/00
(52) U.S. Cl. ............................ 180/315; 482/57; 482/80
(58) Field of Search ......................... 180/315; 482/57, 482/66, 79, 80; 74/473.16, 473.17

(56) References Cited

U.S. PATENT DOCUMENTS

| | | | |
|---|---|---|---|
| 3,513,928 A | | 5/1970 | Emmons |
| 3,939,932 A | | 2/1976 | Rosen |
| 4,700,942 A | * | 10/1987 | Danchulis ..................... 482/57 |
| 5,022,477 A | * | 6/1991 | Wanie ........................ 180/6.34 |
| 5,364,271 A | * | 11/1994 | Aknin et al. .................. 434/61 |
| 5,421,798 A | * | 6/1995 | Bond et al. .................... 601/23 |
| 5,553,684 A | * | 9/1996 | Bolduc ........................ 180/333 |
| 6,152,250 A | | 11/2000 | Shu-Hsien |

FOREIGN PATENT DOCUMENTS

WO    WO 99/30959 A1    6/1999

* cited by examiner

Primary Examiner—Paul N. Dickson
Assistant Examiner—Toan C To
(74) Attorney, Agent, or Firm—Birch, Stewart, Kolasch & Birch, LLP

(57) ABSTRACT

A control system for motor vehicles that uses physical activity to operate the acceleration of a vehicle comprising a mechanical controller that proportionally converts kinetic movement into an electronic signal. An electronic controller uses this signal as well as the current vehicle speed and user preferences to calculate a new pattern of energy flow to the engine. The controller then drives a system that manipulates the vehicle's acceleration or deceleration.

39 Claims, 4 Drawing Sheets

PHYSICAL ACTIVITY CONTROL SYSTEM FOR MOTOR VEHICLES

TECHNICAL FIELD OF INVENTION

The present invention relates to systems for the operation of motor vehicles with specialized control systems. More particularly, the invention relates to systems that control the acceleration and deceleration of a conventional motor vehicle.

The present invention also relates to exercise equipment. More particularly, it relates to maintaining motivation to exercise by coupling exercise with the operation of a motor vehicle.

DESCRIPTION OF THE BACKGROUND ART

The importance of exercise to the maintenance of good health and general well-being has received increased emphasis over the last several years. Today, it is generally recognized that proper exercise may reduce many adverse health risks and contribute to a person's overall physical and mental well-being. As such, the popularity of health clubs and home exercise equipment has increased greatly. Nonetheless, obesity is a growing epidemic in the United States, threatening the health of millions of people and contributing to over 300,000 deaths per year.

Many people, although they would like to exercise, are unable to do so for a variety of reasons. This results in fitness club memberships and exercise equipment that go unused. One such reason is time. Between work, family and other obligations, many people simply do not have the time to travel to a health club and spend the necessary time to exercise despite their best planning. Also, exercising at home may not be an option for many people, again because of the lack of time and also because of typical household distractions, such as family, telephone, etc. Still others feel prohibited from exercising because of the cost associated with fitness club memberships and home exercise equipment.

Most people, however, spend a significant amount of time in their automobile every day. Several devices have been developed to take advantage of this time and encourage exercise to some extent. For instance, U.S. Pat. No. 5,141,482 describes a seat exerciser device comprising a first strap for attachment to a seat, a second strap for attachment around a person's chest and shoulders and a tension member having one end attached to the first strap and the opposite end attached to the second strap. To use, the person moves forward against the tension of the tension member, thereby exercising the chest and stomach muscles.

Another exercise device for a vehicle is described by U.S. Pat. No. 4,013,287. This device comprises an elastic member having a first end with a footrest and a second end attached to the underside of an automobile dashboard. In use, the driver of the automobile places his or her foot onto the footrest and extends the elastic member, thereby exercising leg muscles. Importantly, the nature of this device appears to pose a potential safety risk because it includes a member which hangs down from an automobile dashboard in the vicinity of the drivers legs, the gas pedal and the brake. Thus, it has the potential to impede the driver's ability to properly move his or her legs and access the gas pedal and brake. Furthermore, the device is designed to be bolted or similarly mounted to the underside of the automobile dashboard, posing assembly and mounting difficulties.

U.S. Pat. No. 6,183,403 describes an exercise system for use in an automobile or other vehicle that can be used to exercise arm, shoulder, chest and leg muscles. However, this invention, too, is a distraction from driving and thus cannot be used safely while the vehicle is in motion.

Other exercise devices, such as those described in U.S. Pat. Nos. 5,324,243 and 5,171,295, were designed for use with chairs and may be adapted for use with automobile seats.

Although these background art devices are useful for their intended purposes, none has proven to be entirely effective. Specifically, as discussed above, these devices are either dangerous, bulky, cumbersome or unattractive. Importantly, these devices address the issue of time, but not motivation. There is nothing to motivate the user to exercise other than the desire for exercise.

A small portion of the background art has attempted to address motivation for exercise by linking exercise to transportation. U.S. Pat. No. 3,513,928 describes a motorized cart that allows the operator to take as little or as much exercise as desired during the time that the cart is in operation. This is achieved by providing an adjustable effort exercising device in the form of a pedal driven pump, the inlet and outlet of which are connected in a closed fluid circuit to a motorized cart. Here, the speed of the vehicle varies in accordance with the speed of operation of the exercise device. That is, the pedals must be rotated in order to propel the vehicle and the faster the pedals are turned, the faster the vehicle travels. The vehicle's acceleration and deceleration are directly proportional to the increase or decrease in pedal rate. This device is limited, however, to a particular velocity range that is dependent upon the maximum pedal rate the operator can attain and the operator's ability to maintain that rate. As a consequence, the achievable speeds are limited. Thus, while the vehicle cart of the '928 patent does accomplish the goal of integrating exercise with transportation, the mechanism described would be unsafe on modern roads. This vehicle cannot accommodate the wide range of speeds at which a modern vehicle must operate, such as 5 mph while maneuvering in a parking lot to 65 mph while on a freeway. Furthermore, on a trip of significant duration, such as a typical 30 minute commute, the operator will likely grow tired towards the end of the trip. In this case, the driver will not be able to maintain freeway speeds, creating a serious safety hazard.

U.S. Pat. No. 3,598,195 ('195) describes a tricycle comprising a battery-powered drive motor as well as a pedal system. Either the motor or the pedal system alone can be used to propel the tricycle, but they may also be used in combination to supplement each other. Like the invention described in U.S. Pat. No. 3,513,928, the '195 tricycle has a severely limited velocity range and its acceleration and deceleration is directly proportional to the increase or decrease in pedal rate. Here, the pedals are mechanically coupled to the wheels of the cart. Thus the operator's pedaling physically propels the tricycle. This mechanism cannot work in an automobile because human effort is not enough to influence the movement of a 1500 lb vehicle traveling at 45 mph.

Other inventions have addressed the concept of electronically controlling a vehicle's speed in ways that are not directly proportional to a physical activity. For example, U.S. Pat. No. 3,070,185 describes a system designed to maintain a vehicle's current (i.e. instantaneous) speed. This system consists of an electronic circuit that detects the vehicle's current speed and generates an electronic signal that drives a pneumatically powered throttle positioning system, which is coupled to the accelerator-throttle valve linkage. Modern cruise control systems are based on this system. U.S. Pat. Nos. 3,983,954, 4,072,206 and 5,060,744 further expand on this concept: i.e., to enable the vehicle to maintain its current speed.

U.S. Pat. No. 3,022,580 (Bidwell et al.) describes a system where an automobile is controlled by a single joystick controller. Here, servo motors control the vehicle's acceleration, braking and steering. The purpose of this invention is to provide the driver with a single control for acceleration, braking and steering and to allow the characteristics of these systems to be dependent on the speed of the vehicle.

Bidwell's system was adapted in U.S. Pat. No. 4,476,954 (Johnson et al.), U.S. Pat. No. 4,722,416 (Ahnafield) and U.S. Pat. No. 5,553,684 (Bolduc). The Ahnafield and Johnson systems control the acceleration, braking and steering with a joystick input to an electronic control circuit. The control circuit drives a pair of linear actuators via an electric motor. The actuators are connected to the vehicle's gas and brake pedals. The Bolduc system differs from the Ahnafield and Johnson systems in that it only controls acceleration and braking. It also employs electronic servo motors to manipulate the gas and brake pedals. All the systems use arrangements that allow the vehicle to be operated with the traditional foot pedals as well. Each of the above systems allows a vehicle to be operated with a joystick which requires less physical effort than the traditional foot pedals.

Accordingly, there is still a need in the art for an exercise system that will enable people to exercise in a car or other vehicle while safely maintaining a desirable rate of speed. Any such system should be safe at any speed and provide the ability to exercise with varying amounts of effort, as desired by the operator.

SUMMARY OF THE INVENTION

The present invention is particularly suited to overcome those problems remaining in the art in a manner not previously known. The present invention overcomes these obstacles by making the exercise component an integral part of driving the vehicle. This is accomplished by interfacing the exercise component with an electronic control system that in turn controls the vehicle's acceleration and deceleration. Consequently, the current invention is a system that requires substantially more physical effort for vehicle operation than a typical automobile requires, but does so in such a way that is safe to operate at any speed and for trips of any duration.

The present invention comprises at least one pedal (a mechanical actuator), a motion detection system for detecting the motion of said at least one pedal and a first electrical controller for receiving input from said motion detection system, for comparing the motion rate detected to a threshold rate and for providing output for controlling the acceleration or deceleration of an engine in the motor vehicle. The present invention also comprises a method of exercising while driving a motor vehicle. This is accomplished by exerting physical effort to repetitively move a pedal system and translating the repetitive motion into a signal via a motion detection system. In one embodiment, the acceleration, deceleration and/or velocity of the motor vehicle is controlled by detecting the rate of change of the pedal's repetitive motion. In another embodiment, the acceleration, deceleration or velocity of the motor vehicle is controlled by detecting the rate of the pedal's motion as it passes a fixed location. A third embodiment allows the acceleration, deceleration or velocity of the motor vehicle to be controlled by measuring the time the pedal takes to complete one cycle. The change in pedal speed or motion, the rate of the pedal's motion or the time the pedal takes to complete one cycle can be measured in several different ways, such as by detecting a magnetic, optical, electrical or mechanical signal.

The signal produced from the motion detector system is transferred to a first electrical controller that contains a transfer function that receives input from the pedal motion detection system and provides output for controlling the operation of an engine in the motor vehicle. A user interface is coupled with the transfer function that relates input into said first electrical controller to output for controlling the operation of said engine and a vehicle interface that receives output from the first electrical controller and provides output to a vehicle engine control system resulting in a change of acceleration, deceleration or velocity of the vehicle.

DEFINITIONS

The Specification uses the definitions below for the following terms:

Acceleration: "Acceleration" is used in the common sense. That is, the positive change in velocity over time.

Acceleration Quantity (ACC): This value is used to change the current speed to reach a new desired speed.

Acceleration rate: This term is used to describe a fixed ratio between acceleration and time.

Acceleration variable: This is a factor set by the operator that controls how much of a change in repetitive motion rate will result in an increase in acceleration.

Deceleration: "Deceleration" is used in the common sense. That is, the negative change in velocity over time. Negative acceleration.

Deceleration rate: This term is used to describe a fixed ratio between deceleration and time.

Deceleration variable: This is a factor set by the operator which controls how much of a change in repetitive motion rate will result in an increase in deceleration.

Driver's pedal rate: This term is the rate at which the driver is operating the pedal system (mechanical actuator).

Instantaneous speed: The current speed of the vehicle.

Kinetic input: physical exertion on a system, preferably via a repetitive motion.

Pedal resistance: The amount of resistance that opposes the movement of the pedals. This value may or may not affect the transfer function of the first electronic controller.

Repetitive motion rate: This term refers to a number of identical motions per unit of time.

Rate: "Rate" refers to a quantity, amount, or degree of something measured per unit of time.

Speed: The rate of motion with respect to time.

Transfer function: This term refers to the algorithm used by the first controller to evoke a change in acceleration or deceleration of the vehicle. It can be represented as:

(repetitive motion rate−threshold rate)×acceleration or deceleration variable=vehicle acceleration or deceleration Threshold motion rate: The rate at which the driver must operate the pedal assembly in order for the vehicle to maintain its current speed. The driver specifies this rate with the user input controller.

Threshold tolerance: This value represents the variance allowed in the driver's pedal rate before affecting the acceleration, deceleration or velocity of the vehicle.

Velocity: Velocity is the rate of change of position with respect to time.

DETAILED DESCRIPTION OF THE INVENTION

Figure 1:
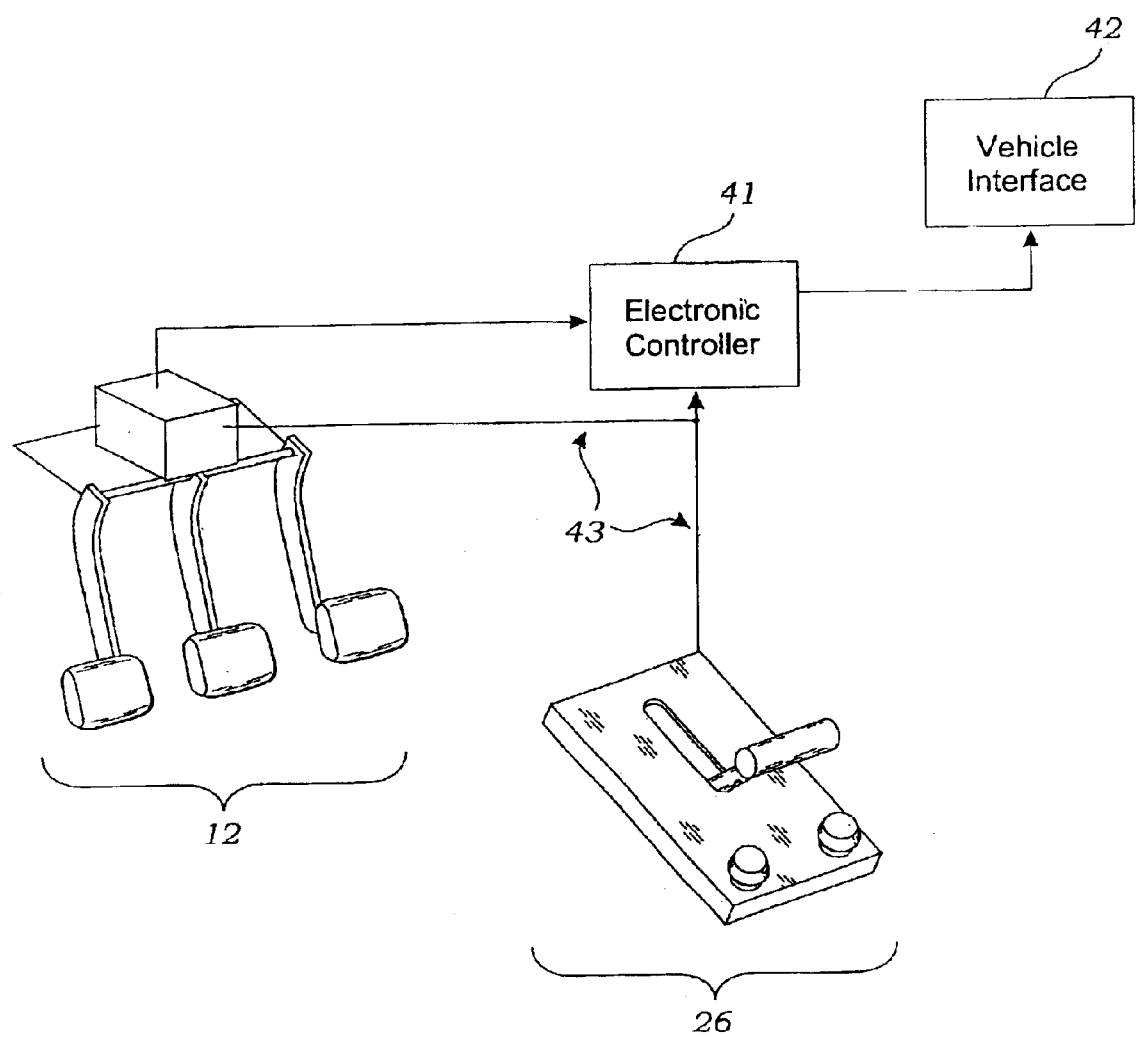
FIG. 1 illustrates an exemplary relationship between the pedal assembly, the motion detector system, the first electrical controller and the vehicle acceleration, deceleration or velocity interface.

The present invention is directed towards an exercise system used to control the acceleration, deceleration and velocity of a motor vehicle. This system comprises a mechanical system that requires repetitive physical motion (kinetic input) to operate, a system for detecting the repetitive motion rate and a first electrical controller that accepts the input from the repetitive physical motion detector. The first electrical controller performs a transfer function that compares the repetitive motion rate to a threshold motion rate and relates this input to output for controlling the operation of the vehicle's engine. If the repetitive motion rate or the driver's pedal rate exceeds the threshold rate, the vehicle will begin to accelerate. The vehicle will continue to accelerate until the pedal rate is reduced to the threshold rate, within a given tolerance. At this point, the vehicle will maintain its current speed as long as the pedal rate remains at the threshold rate and within the threshold tolerance. If the pedal rate drops below the threshold rate and outside of the threshold tolerance, the vehicle will decelerate until the pedal rate increases or the vehicle comes to a stop. FIG. 1 shows this relationship between the pedal assembly (12), programmable first electrical controller (41) and the vehicle interface (42).

Figure 4:
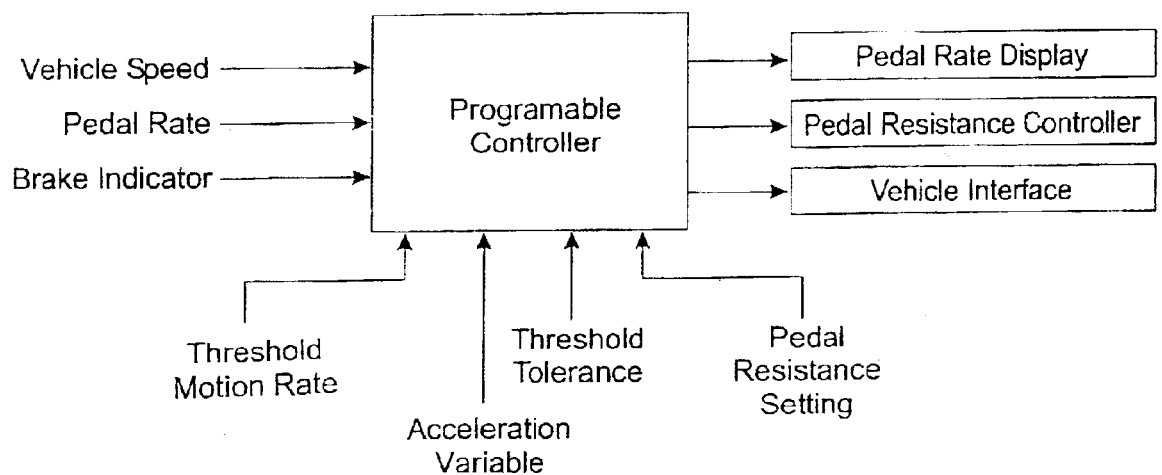
FIG. 4 depicts an exemplary block diagram schematic of a programmable first electrical controller in accordance with the invention.

The system may also include a user interface for controlling variables within the transfer function of the first electrical controller or that may affect operation of the pedals, including pedal resistance. Examples of these variables are the threshold motion rate, the acceleration variable, the threshold tolerance and the pedal resistance. FIG. 4 described below, illustrates some of the user preference inputs as well as inputs from the pedal assembly system that can be linked to the first electrical controller.

Figure 2:
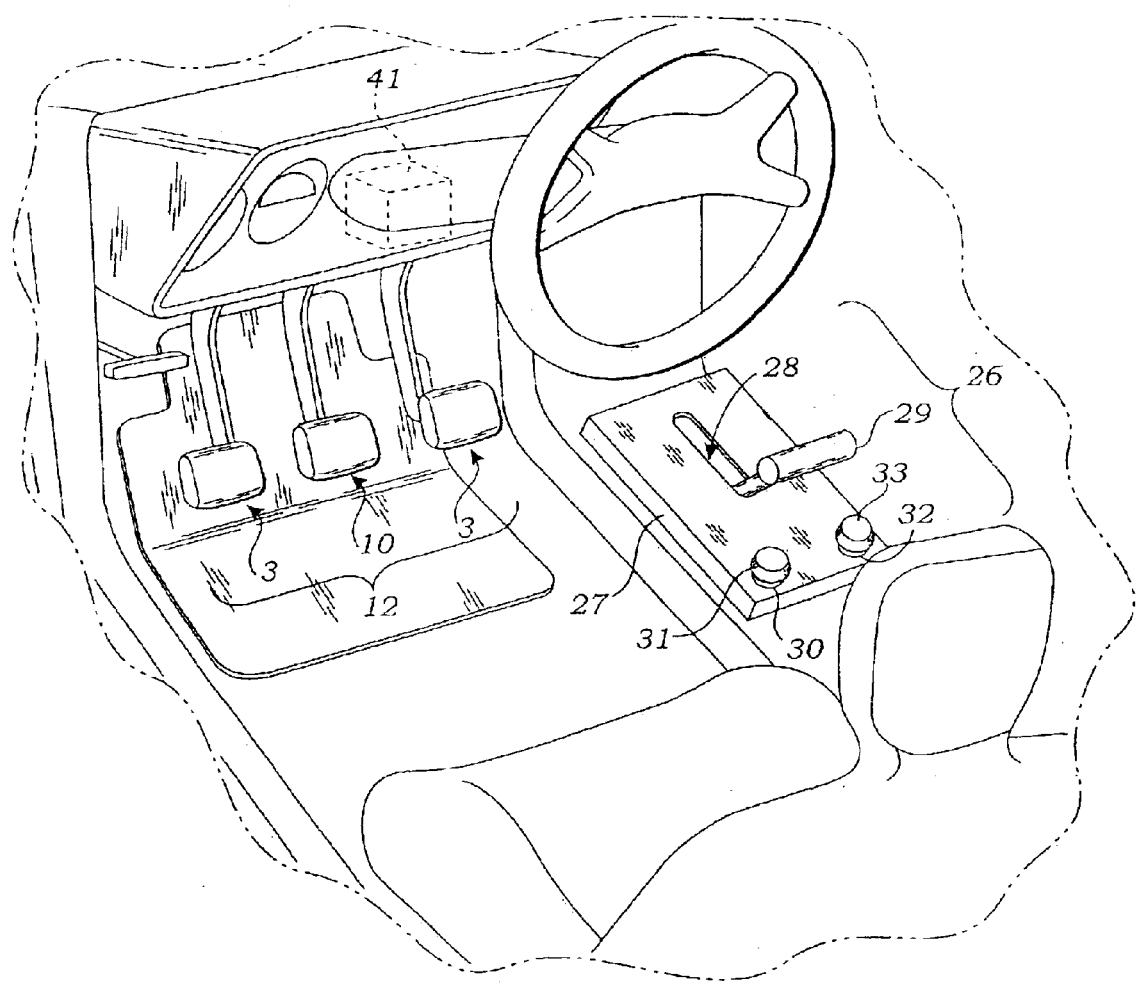
FIG. 2 illustrates an overall schematic of an exemplary implementation in accordance with the invention.

FIG. 2 illustrates an overall schematic of an exemplary implementation in accordance with the invention. This exemplary embodiment secures the pedal assembly (12) under the dashboard to the vehicle's firewall, leaving the user controls (26) visible.

The system may also contain a vehicle interface for receiving output from the first controller and providing output to a vehicle engine control system. An example of a vehicle interface is a throttle interface. A throttle interface manipulates the vehicle's existing throttle system, for example by manipulating the throttle cable directly via an electric motor.

Alternatively, the vehicle's acceleration, deceleration and/or speed are manipulated via a link into the vehicle's onboard computer system or via a magnetic, electrical or optical interface with the vehicle's onboard computer system. This manipulation then increases or decreases the amount of fuel and/or air that flows into the engine and is capable of changing the acceleration or deceleration of the vehicle. In the case of electric vehicles and other vehicles that do not contain a throttle, the vehicle interface will regulate the flow of energy to the engine by suitable mechanical, magnetic, electrical or optical means.

In one embodiment, the mechanical system is comprised of two pedals mounted in front of the driver to the left and right of the vehicle's existing brake pedal. The two pedals may act independently or can be reciprocally connected by a cable, a rigid connector or a hydraulic system in such a way that pressing down on one pedal causes the opposite pedal to rise. The pedals are also connected to a resistance mechanism that allows the operator to adjust the amount of effort needed to move the pedals. The resistance mechanism can be an adjustable spring or a hydraulic cylinder. A detector detects the movement of the pedals or the cable connecting the two pedals and generates a mechanical, magnetic, electronic or optical signal and transmits it to the first electrical controller. The first electrical controller compares this signal to a threshold rate that is specified by the operator via a second controller.

The threshold motion rate can be set to either a single value or a discrete range of values. For example, a threshold value of 25/min would require 25 repetitive motions to be detected in a one minute time interval in order to avoid either acceleration or deceleration of the vehicle. If the first electrical controller computes more repetitive movements than specified by the threshold value, the first controller transfers output to the vehicle interface, causing the vehicle to accelerate. Acceleration will continue until the repetitive movement rate is equal to or within a pre-set threshold tolerance range of the threshold rate. Similarly, if fewer repetitive movements are detected, the vehicle decelerates. This system is thus advantageous over the conventional systems in that pedal movement is not directly proportional to the speed of the vehicle. With this system, the vehicle can be operated at any speed by operating the kinetic input at the user specified threshold rate. Additional effort is only required to change the acceleration of the vehicle.

Figure 3:
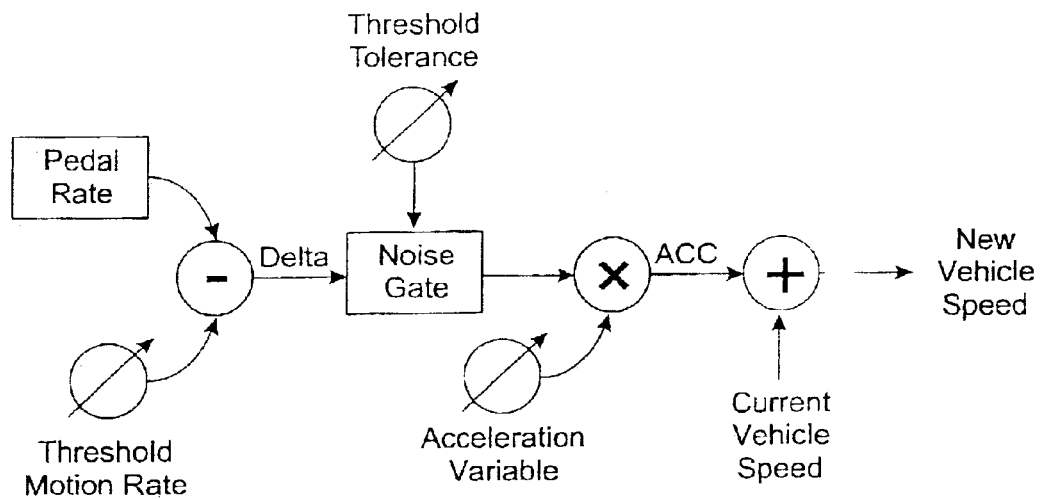
FIG. 3 depicts an exemplary transfer function block diagram used to calculate the new vehicle acceleration in accordance with the invention.

FIG. 3 depicts an exemplary block diagram of the transfer function used to calculate a new vehicle acceleration. Here the driver's pedal rate is compared to the threshold motion rate. The threshold motion rate can be set to specify either the speed at which the pedal, connector or indicator passes a specific point, the amount of time needed to complete one repetitive motion cycle or the number of repetitive motions that must be detected in a specific time interval in order to maintain the vehicle's current speed. The delta ($\Delta$), or difference between the driver's pedal rate and the threshold pedal rate is computed. If the absolute value of delta is greater than a specified threshold tolerance, it will be multiplied by an acceleration variable to calculate a new acceleration quantity (ACC). A positive ACC value accelerates the vehicle while a negative value directs deceleration. The ACC value is added to the current vehicle velocity to produce the new vehicle speed The first electrical controller can also accept input from a user interface that indicates user preferences. The user interface controls variables within the transfer function of the first controller and other user preferences. This transfer function relates input into the controller to output for controlling the operation of the engine. Two such examples of user preferences are the threshold setting (number of repetitive motions per unit of time needed to maintain speed) and the acceleration variable. As depicted in FIG. 4, the first electrical controller may also accept inputs that affect the force setting (i.e. pedal resistance, which is the amount of force needed to move the pedal) and this setting may or may not have an effect on the transfer function.

Vehicle braking is accomplished using the brake pedal, which is typically in the center of the two pedals used to control the acceleration and deceleration of the vehicle. In one embodiment, the brake pedal will not need to be modified from the conventional design, and the controller unit will be mounted around it. That is, the brake pedal will operate normally and according to the manufacturer's design. In another embodiment, the brake pedal will be part of the controller unit that is connected to the vehicle's existing braking system.

An over-ride mechanism is also provided that allows the operator to disengage the exercise system so that the vehicle can be operated normally.

The instant invention is also directed to a method of exercising while driving a motor vehicle comprising the steps of (a) exerting force on a mechanical system that requires repetitive physical effort (kinetic input) to operate, (b) generating an mechanical, magnetic, electronic or optical signal representative of the repetitive movement (c) transferring the repetitive movement mechanical, magnetic, electronic or optical signal to a first electrical controller (d) comparing the repetitive mechanical, magnetic, electronic or optical signal to a threshold value, (e) transforming the first electrical controller inputs to a desired vehicle response and (f) interfacing that response to the system that controls the vehicle's acceleration via either a mechanical, electrical, magnetic or optical interface.

The instant invention can be embodied in many different forms. The drawings and description provide preferred embodiments of the invention. These are not, however, intended to limit the spirit and scope of the invention and/or claims, but merely to provide an example of the principles of the invention.

DETAILED DESCRIPTION OF A PREFERRED EMBODIMENT

Figure 5:
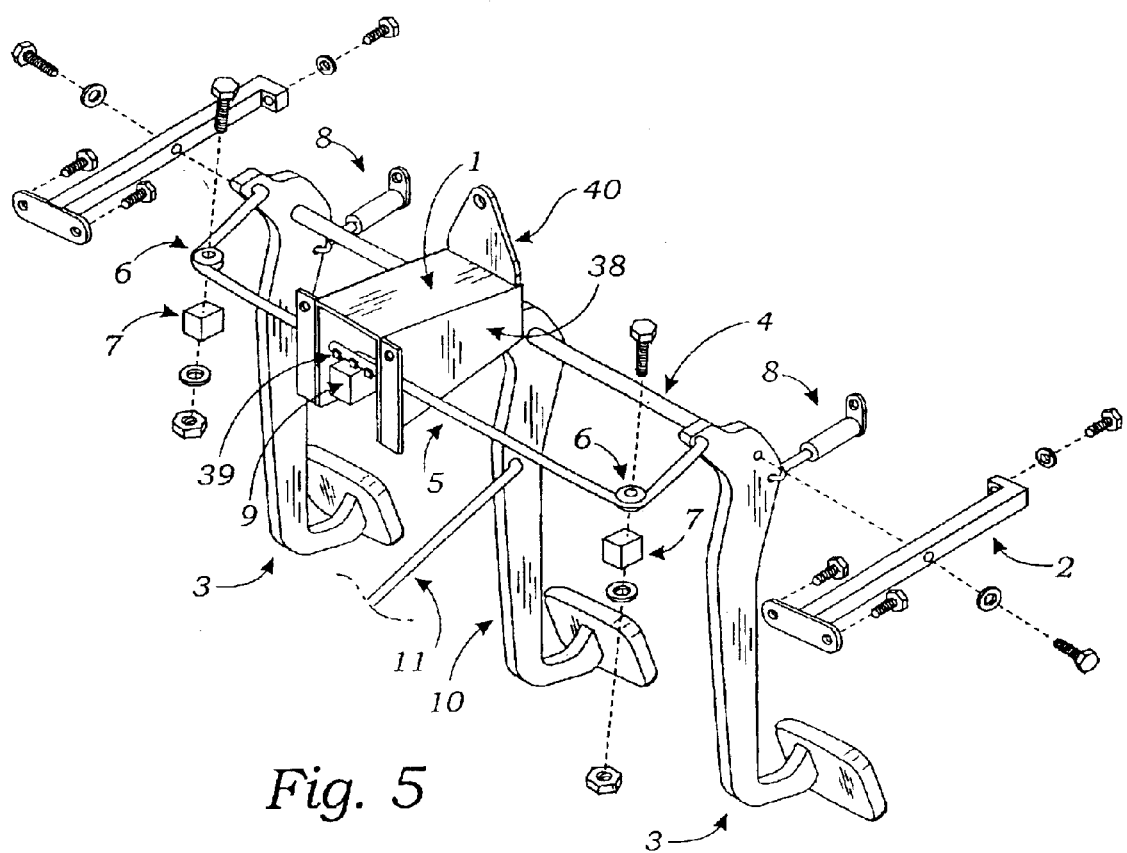
FIG. 5 illustrates a three dimensional view of an exemplary pedal assembly and motion detector in accordance with the invention.

FIG. 5 shows one exemplary embodiment of the pedal assembly. The pedal assembly is secured under the dashboard to the vehicle's firewall by way of a center mounting bracket (1). This bracket (1) comprises a rectangular-shaped body, open at each of the small ends. One small end has a triangular protrusion (40) extending at a 90° angle from the second rectangular side of the bracket and away from the small open end, which serves as the attachment point to the vehicle's firewall and/or cross-car support beams. The other small end has two small rectangular protrusions, each identical in height to the narrow face of the first and third rectangular walls of the bracket and extending from each rectangular wall (38) at a 90° angle. The central mounting bracket (1) can be constructed of metal (aluminum, alloys, etc.), high impact durable plastics or any other suitable material.

The end of the central mounting bracket (1) contains a triangular protrusion (40) and three walls: top, left and right. The triangular protrusion (40) is positioned over the vehicle's original brake pedal (10), allowing the brake pedal to move freely between the first and third rectangular walls (38) of the central mounting bracket (1). One end of each of the two connector rods (4) is attached to the central mounting bracket (1) at the end comprising the triangular protrusion, one attached to the first rectangular wall and one attached to the third rectangular wall. The other end of each of the connector rods (4) passes through one end of a pedal (3) in such a way that the pedal is held in place, but can move freely. Preferred material for the pedals (3) are metal (aluminum, alloys, etc.), high impact durable plastics or any other suitable material that can withstand impact and repetitive movement. The end of the pedal (3) that is free of the connector rod (4) will typically comprise a plate with raised edges that contacts the operator's foot. A pad made of rubber, plastic, felt or other suitable material is then attached to prevent the operator's foot from slipping off the foot pedal (3). Side mounting brackets (2) attach adjacent to the pedals (3) and serve to secure the connector rods (4) to the vehicle's firewall and/or cross-car support beams. The side mounting brackets are preferably constructed of high strength materials such as metal and metal alloys, and durable high strength plastics.

A belt (5) connects the two outermost pedals (3). This belt (5) is attached to the top of each of the pedals (3) above the pass-through point of the connector rod (4) in such a way that pressing down on one pedal (3) causes the other pedal (3) to rise. Alternatively, a cable, chain, rigid connector or hydraulic system can be substituted for the belt (5).

In one embodiment, the belt is attached to the right pedal (3), travels across a pulley (6), through the center mounting bracket (1) and across a second pulley (6) before attaching to the left pedal (3). Each of the pulleys (6) is attached to a pulley bracket (7), which is secured to the vehicle's firewall. Thus, the pulleys (6) hold the belt (5) in position and guide it through the central bracket (1). Ideally, the belt (5) is an electrometric/rubber belt, however belts made of nylon, metal or impregnated fabric, as examples, can also be used. The belts can contain "v" shaped notches or be smooth. One of skill in the art will appreciate that the function of the belt (5) may also be accomplished by incorporating a chain and sprocket, wire and pulley arrangement, hydraulics and/or their equivalents.

A controllable resistance device (8) provides resistance to the pedals (3). Examples of suitable controllable resistance devices are springs with an adjustable tension or hydraulic resistance devices.

A repetitive motion detector system (9) is attached to the central mounting bracket (1) so that a mechanical, magnetic, electrical or optical signal from the belt (5) or its movement can be detected. Numerous embodiments of the repetitive motion detector system can be created. For example, the belt connecting the two pedals can drive a pulley connected to an electronic generator. Here, belt movement would drive the generator, creating an electrical signal proportional to the speed at which the belt moved. In another embodiment magnets (39) are mounted on a pulley driven by the belt. When a magnet crosses in front of a Hall Effect sensor, it generates an electric signal. The distance between pulses indicates the speed of the belt. In yet another embodiment, the changes in pressure within hydraulic cylinders is monitored and used to calculate the pedal. Here, the hydraulic cylinders are mounted behind the firewall and connected to the pedal so that as the pedal is pressed it increases the pressure in the cylinder. An example of such a system is described in U.S. Pat. No. 4,354,676, which is herein incorporated by reference in its entirety.

FIG. 2 shows an exemplary placement of the user controls (26) in the vehicle. Here, the user controls (26) comprise a case (27) having a floor and sides with a slot for a linear slide potentiometer (28) and openings for two rotating potentiometers (30, 32). This case can be composed of metal, such as aluminum, alloys or plastic. A "T" shaped handle (29) connects to the linear slide potentiometer allowing the driver to change the potentiometer settings and thereby control how quickly the vehicle accelerates. A rotating potentiometer (30), protected by a cap (31), is mounted on the floor of the case (27) and allows the user to control the amount of physical effort required to operate the vehicle. A second rotating potentiometer (32), protected by a cap (33) is also located floor of the case (27) and provides the ability for the user to control how the change in pedal rate will generate a change in the vehicle's speed. FIG. 1 illustrates that signal from the user controls is combined (43) with that from the pedal assembly (12) and repetitive motion detector system and delivered to the first electrical controller (41). One way that this can be accomplished is via a multi-wire cable held in place with standard connector pins, one male and one female, or other appropriate fastening devices. Here, a fixed voltage is provided by the controller circuit and is applied across the three potentiometers (28, 30 and 32). The resultant voltage is returned to the controller circuit.

A programmable first electric controller (an example of which is diagramed in FIG. 4) accepts inputs from the pedal system and other inputs such as vehicle speed and the user preferences. Examples of user preferences are threshold pedal rate, the acceleration variable, and the force (pedal resistance) setting. The programmable first controller then calculates a new vehicle speed, acceleration rate and/or throttle position for the vehicle based on these and other inputs. These other inputs may include the vehicles current speed and a signal indicating whether the brake is engaged or not.

FIG. 3 depicts the transfer function used to calculate the new vehicle acceleration. This algorithm can be represented as:

(repetitive motion rate−threshold rate)×acceleration or deceleration variable=vehicle acceleration or deceleration Here, repetitive motion is detected by the repetitive motion detector, which generates a mechanical, magnetic, electrical or optical signal that is transferred to the first electrical controller. The first electrical controller then calculates the difference between this repetitive motion rate and a threshold motion rate set by the operator. The resulting value is multiplied by the acceleration or deceleration variable. This variable is set by the operator and controls how changes in repetitive motion will affect acceleration or deceleration. For example, if the acceleration variable is high, a small increase in the repetitive motion rate will result in a large increase in acceleration. This scenario is appropriate for freeway driving. Alternatively, if the acceleration variable is small, than a large change in the repetitive motion rate will result in a small change in the vehicle's acceleration rate, a scenario more appropriate for low speed driving, such as on residential streets and parking lots. Thus, the product of the transfer function is used by the first controller to evoke a change in the energy flow to the engine, thereby altering the speed of the vehicle.

The invention also provides an apparatus for doing exercise while driving a motor vehicle. Here, the driver exerts force on the mechanical system comprising the pedals in a repetitive manner. The repetitive movement generates a mechanical, magnetic, electrical or optical signal proportional to the repetitive movement and is transferred to a first electrical controller. The first electrical controller compares the repetitive mechanical, magnetic, electrical or optical signal to a threshold value and transforms these inputs into a desired vehicle response by interfacing with the system that controls the vehicle's acceleration system. This is accomplished via a a mechanical, magnetic, electrical or optical interface.

While the above description contains many features, these should not be construed as limitations on the scope of the invention, but rather as examples of the preferred embodiments thereof. Many other variations are possible, which will be apparent to those skilled in the art. The invention encompasses changes made within the spirit and scope described.

I claim:

1. An exercise system for controlling the acceleration and/or deceleration of a vehicle having a prime mover which comprises:
    a) at least one pedal, disposed to controllably move between a first position and a second position by said prime mover;
    b) a repetitive motion detection system, disposed to detect at least one movement of said at least one pedal and generate a signal representative of said movement; and
    c) a first controller, disposed to receive said signal from said motion detection system, compare said signal to a threshold rate range and provide an output for controlling one of acceleration and deceleration of said motor vehicle.

2. The exercise system of claim 1, wherein said signal is representative of one of:
    a) the number of repetitive motions within a predetermined period;
    b) speed of said pedal as it moves past a fixed point;
    c) amount of time for said pedal to complete between first and second locations.

3. The exercise system according to claim 1, wherein a decrease in repetitive motions detected by said repetitive motion detection system compared to the threshold rate range results in deceleration of said motor vehicle.

4. The exercise system according to claim 1, wherein an increase in repetitive motions detected by said repetitive motion detection system compared to said threshold rate range results in acceleration of said vehicle.

5. The exercise system according to claim 1, wherein no change in the number of repetitive motions detected by said repetitive motion detection system compared to the threshold rate range maintains the current velocity of said vehicle.

6. The exercise system according to claim 1, wherein said repetitive motion threshold rate range is set via a second controller.

7. The exercise system according to claim 6, wherein said second controller receives input from an operator and provides output to the first controller.

8. The exercise system of claim 6, wherein said second controller comprises at least one potentiometer.

9. The exercise system of claim 8, wherein one said potentiometer is a sliding potentiometer or a rotating potentiometer.

10. The exercise system of claim 8, wherein one said potentiometer controls the rate of repetitive movement necessary for said threshold rate range.

11. The exercise system of claim 8, wherein one said potentiometer controls the variance in repetitive motion required to exceed or fall below said threshold range.

12. The exercise system according to claim 1, wherein said system further comprises a pedal system comprising a pair of pedals reciprocally connected between at least one belt.

13. The exercise system according to claim 12, wherein said pedal system is mounted in front of the driver's seat.

14. The exercise system according to claim 12, wherein said exercise system further comprises a throttle interface.

15. The exercise system according to claim 13, wherein said pedals are mounted under a dashboard.

16. The exercise system according to claim 13, wherein said pedal system is a flat track.

17. The exercise system according to claim 15, wherein said flat track is mounted to the floor.

18. The exercise system according to claim 1, wherein said repetitive motion detection system generates an electronic signal.

19. The exercise system according to claim 18, wherein said electronic signal is generated in proportion to the rate of pedal motion.

20. The exercise system according to claim 18, wherein said electronic signal is a signal that represents the rate of pedal motion.

21. The exercise system according to claim 1, wherein said first controller accepts the electronic signal of said repetitive motion detection system.

22. The exercise system according to claim 1, wherein said output of said first controller is an electronic signal.

23. The exercise system according to claim 1, further comprising a user interface.

24. The exercise system according to claim 23, wherein said user interface controls variables within a transfer function of said first controller.

25. The exercise system according to claim 24, wherein said transfer function relates input into said controller to output for controlling the operation of said engine.

26. The exercise system according to claim 1, further comprising a vehicle interface for receiving output from said first controller and providing output to a vehicle engine control system.

27. The exercise system according to claim 26, wherein said first controller uses at least one input to calculate at least one value selected from the group consisting of a vehicle speed, an acceleration rate, a deceleration rate and a throttle position.

28. The exercise system according to claim 14, wherein said throttle interface manipulates said vehicle's existing throttle system.

29. The exercise system according to claim 28, wherein said manipulation comprises directly manipulating a throttle cable.

30. The exercise system according to claim 29, wherein said throttle cable manipulation occurs via an electric motor.

31. The exercise system according to claim 28, wherein said manipulation occurs via a direct link into said vehicle's onboard computer system.

32. The exercise system according to claim 28, wherein said manipulation occurs via an interface with the vehicle's onboard computer system.

33. The exercise system according to claim 28, wherein said manipulation increases or decreases an amount of fuel or electricity that flows into the engine.

34. The exercise system according to claim 16, wherein the acceleration or deceleration of said vehicle changes.

35. The exercise system according to claim 1, wherein a change in the number of repetitive motions in said time detected by said repetitive motion detection system compared to the threshold rate range affects the current velocity of said vehicle in a predetermined way.

36. A system for controlling acceleration or deceleration of a vehicle having a prime mover which comprises:

a) two pedals positioned in front of a vehicle driver;

b) a repetitive motion detection system for detecting the repetitive motion of said pedals in a specific period of time and generating an electrical or optical signal representative of the average rate of the repetitive motion of said pedals;

c) a first controller for receiving input from said repetitive motion detection system and for providing output for controlling the acceleration or deceleration of an engine in the motor vehicle;

d) a user interface for controlling variables within the transfer function of said first controller, wherein said transfer function relates input into said controller to output for controlling the operation of said engine; and e) a vehicle interface for receiving output from said first controller and providing output to a vehicle engine control system.

37. The system according to claim 36, wherein said transfer function accepts at least one input selected from the group consisting of vehicle speed, acceleration rate, deceleration rate, and throttle position.

38. A method of exercising while driving a vehicle having a prime mover comprising the steps of:

a) repetitively moving a pedal system that requires physical effort to operate;

b) translating said repetitive motion into an electronic or optical signal via a repetitive motion detection system;

c) coupling said repetitive motion detection system to a first controller that compares the rate of repetitive motion to a repetitive motion threshold range and then uses a transfer function that receives input from said repetitive motion detection system and provides output for controlling the operation of a prime mover in said motor vehicle;

d) coupling a user interface with said transfer function that relates input into said controller to output for controlling the operation of said engine; and e) coupling a vehicle interface for receiving output from said first controller and providing output to a vehicle engine control system.

39. A method of exercising while driving a vehicle having a prime mover comprising the steps of:

a) repetitively moving a pedal system that requires physical effort to operate;

b) translating said repetitive motion into an electronic or optical signal via a repetitive motion detection system;

c) coupling said repetitive motion detection system to a first controller with a transfer function that receives input from said pedal speed detection system and provides output for controlling the operation of a prime mover in said motor vehicle;

d) coupling a user interface with said transfer function that relates input into said controller to output for controlling the operation of said engine;

e) coupling a vehicle interface for receiving output from said first controller and providing output to a vehicle engine control system; and f) transforming said first controller outputs to manipulate a throttle position to result in a change of acceleration or deceleration of the vehicle.

* * * * *